United States Patent [19]

Conley et al.

[11] Patent Number: 5,219,115
[45] Date of Patent: Jun. 15, 1993

[54] METHOD AND APPARATUS FOR TESTING WELDS

[75] Inventors: Allen Conley, Yorktown, Va.; Sang J. Hamilton, Winton, N.C.; Mark D. Debbink, Chesapeake; Rubert E. Minton, Carrollton, both of Va.

[73] Assignee: Newport News Shipbuilding and Dry Dock Company, Newport News, Va.

[21] Appl. No.: 945,843

[22] Filed: Sep. 16, 1992

Related U.S. Application Data

[63] Continuation of Ser. No. 839,365, Feb. 21, 1992, abandoned.

[51] Int. Cl.⁵ .............................................. B23K 31/12
[52] U.S. Cl. .................................... 228/104; 228/178; 228/184; 114/79 W; 73/46
[58] Field of Search ............... 228/103, 104, 178, 184; 114/79 W; 73/40, 46; 403/272

[56] References Cited

U.S. PATENT DOCUMENTS

| | | | |
|---|---|---|---|
| 2,177,927 | 10/1939 | Hodge | 403/272 |
| 2,222,079 | 11/1940 | Larson | 228/104 |
| 3,490,268 | 1/1970 | Hand et al. | 73/40 |
| 3,747,551 | 7/1973 | Bennekers | 228/178 |
| 3,813,921 | 6/1974 | Ozawa et al. | 73/40 |
| 4,577,488 | 3/1986 | Broadus et al. | 228/103 |

FOREIGN PATENT DOCUMENTS

| | | | |
|---|---|---|---|
| 2323295 | 5/1977 | France | 73/46 |
| 241953 | 1/1987 | German Democratic Rep. | |
| 317012 | 4/1934 | Italy | |
| 1658 | 1/1976 | Japan | 228/104 |
| 511658 | 1/1976 | Japan | |
| 144392 | 11/1980 | Japan | 228/104 |

*Primary Examiner*—Kenneth J. Ramsey
*Attorney, Agent, or Firm*—Lalos & Keegan

[57] ABSTRACT

The method and structure permit the testing of welds forming the structure. The structure comprises a base plate, a longitudinal member on the base plate, a web having an opening positioned over the longitudinal member, and a lap collar having an air hole and covering the web opening. An air channel is formed by welds formed between welded abutting surfaces of the base plate and the web, and between the web and the longitudinal member, and between the lap collar and the base plate, and between the lap collar and the longitudinal member. The air channel is continuous along the entire length of the web and base plate thereby permitting the detection of defects in the entire length of welds when the air channel is pressurized through the air hole.

46 Claims, 3 Drawing Sheets

METHOD AND APPARATUS FOR TESTING WELDS

This is a continuation of copending application Ser. No. 07/839,365 filed on Feb. 21, 1992, now abandoned.

BACKGROUND OF THE INVENTION

This invention relates to a method and apparatus for testing welds, and, more particularly, to the testing of welds by use of pressurized air.

In the construction of ships and other vessels, openings are typically provided in a structural member to allow one member to pass through another member at the opening. These openings are usually larger than necessary to provide for slight variations in construction, i.e., variations in spacing and height. Once the members are in place the openings are typically closed by using a collar, which can be of a variety of configurations, such as a collar which fits into the opening, or a collar that overlaps at least part of the structural member. The latter is called a lap collar. While the lap collar generally has certain advantages over the other types of collars, it will be seen that the lap collar of the present invention has the additional advantage of permitting the testing of the welded connection between a number of collars and longitudinal members along the entire length of a web.

Regardless of the collar being used, it is critical that certain welded boundary connections be leak free in order to prevent both the contamination of cargo and the leakage of cargo to ballast tanks. Extensive testing of these welds for leaks is thus required.

This inspection and testing process is typically conducted after the final construction of the vessel and while the vessel is in dry dock. A tank or compartment is pressurized in the range of two to five pounds per square inch (p.s.i.), with a soap solution applied to the boundary welds on the outside of the tank. Leaks through the welds form bubbles, which are easily observed. The leaks are then marked and repaired.

Because this procedure is conducted at a late stage in the vessel construction, the test is cumbersome to perform. Furthermore, it is often difficult to gain access to the faulty welds, adding to the repair time and expense. It would be desirable to conduct inspection tests during the assembly stage of construction and under highly controlled conditions. Additionally, a test using highly pressurized air will identify more defects in the welds than the prior art low pressure tank method Accordingly, the objects of the present invention are to provide the following:

a) An improved collar structure for ships;

b) An improved structure and method for testing of welds on ships;

c) An improved structure and method for conducting oiltight and watertight boundary weld tests using pressurized air; and d) An improved structure and method for the testing of welds at intermediate stages of the vessel construction.

Other objects and advantages of the present invention will become more apparent from the following description taken in conjunction with the accompanying drawings.

DESCRIPTION OF THE PREFERRED EMBODIMENT

Figure 1:
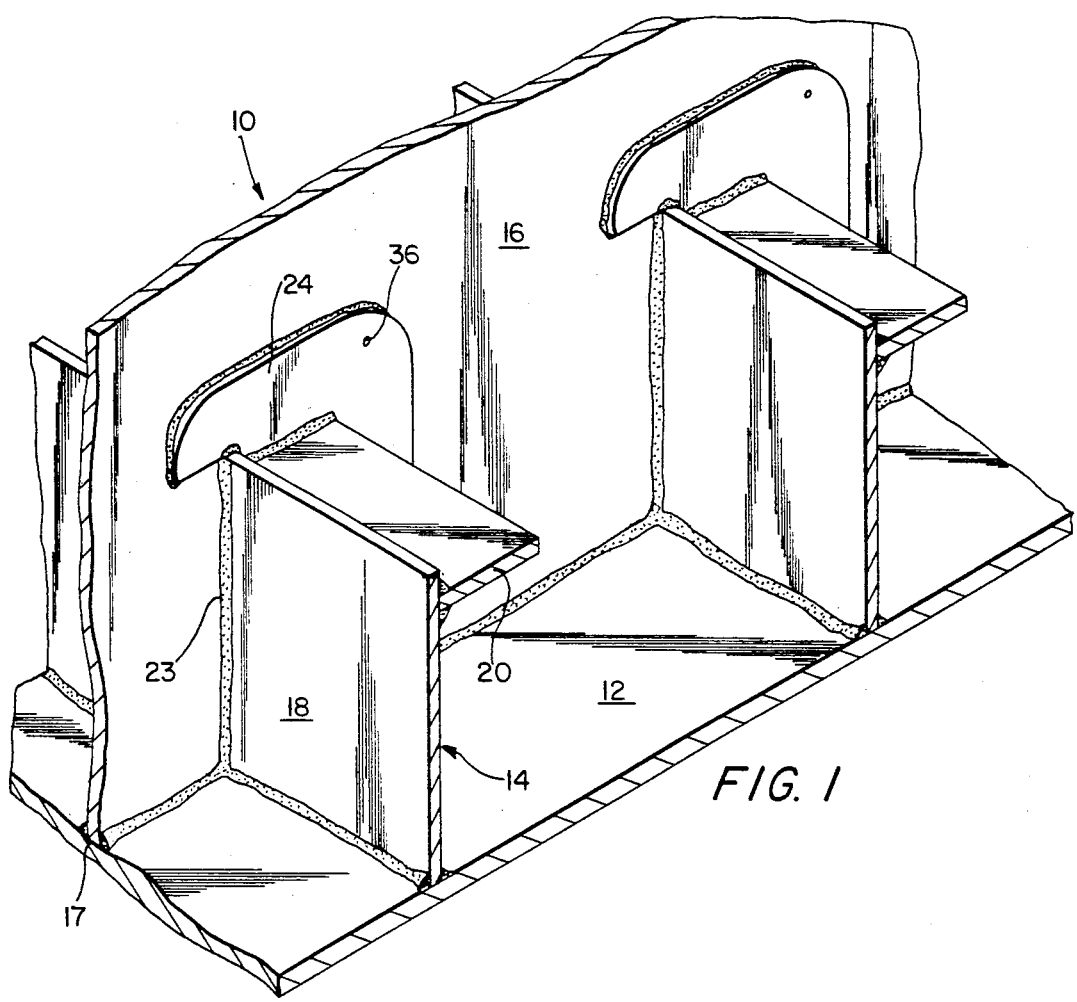
FIG. 1 is a perspective view of the preferred embodiment of the present invention.
Figure 2:
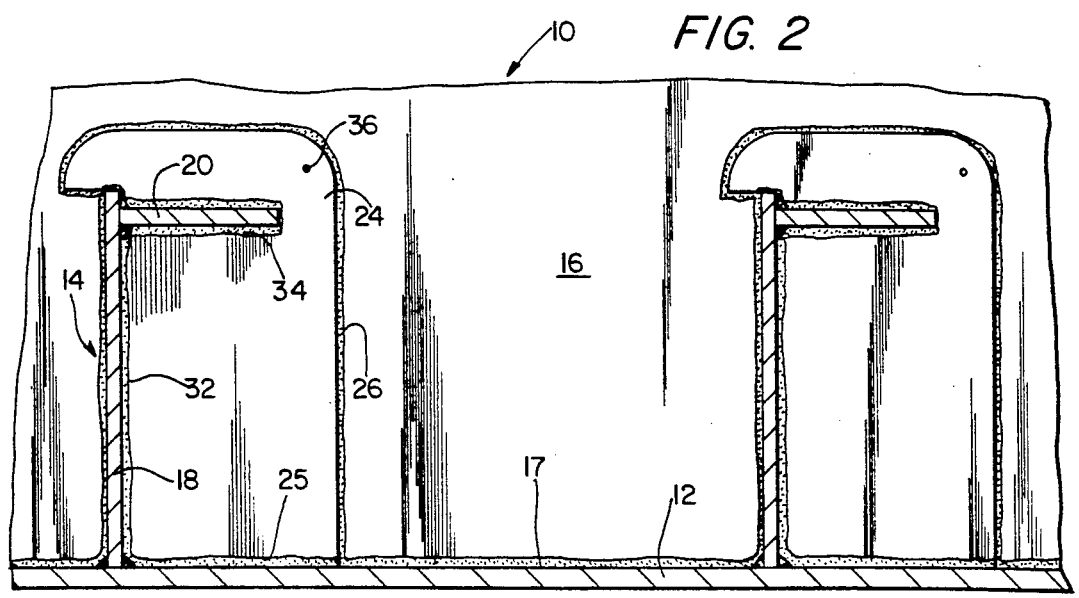
FIG. 2 is a front view of the embodiment of FIG. 1.

Referring to the illustration of the present invention shown in FIGS. 1-8, the welded assembly, shown generally as 10, includes a base plate 12, which may be, for instance, the hull of a ship. Assembly 10 further includes at least one longitudinal member 14 welded to base plate 12 and a web 16 vertically abutting base plate 12 at a lower edge 17. Typically, assembly 10 will include a plurality of longitudinal members 14 spaced along base plate 12, with web 16 being positioned perpendicularly relative to the longitudinal members. In the configuration shown in the drawings, longitudinal member 14 includes an upstanding web portion 18 and a protruding flange 20 perpendicular to web portion 18, such that the longitudinal member 14 resembles an inverted "L" shape. However, it is to be understood that the invention described herein is readily modifiable to adapt to any longitudinal member configuration, including a flat plate.

Figure 3:
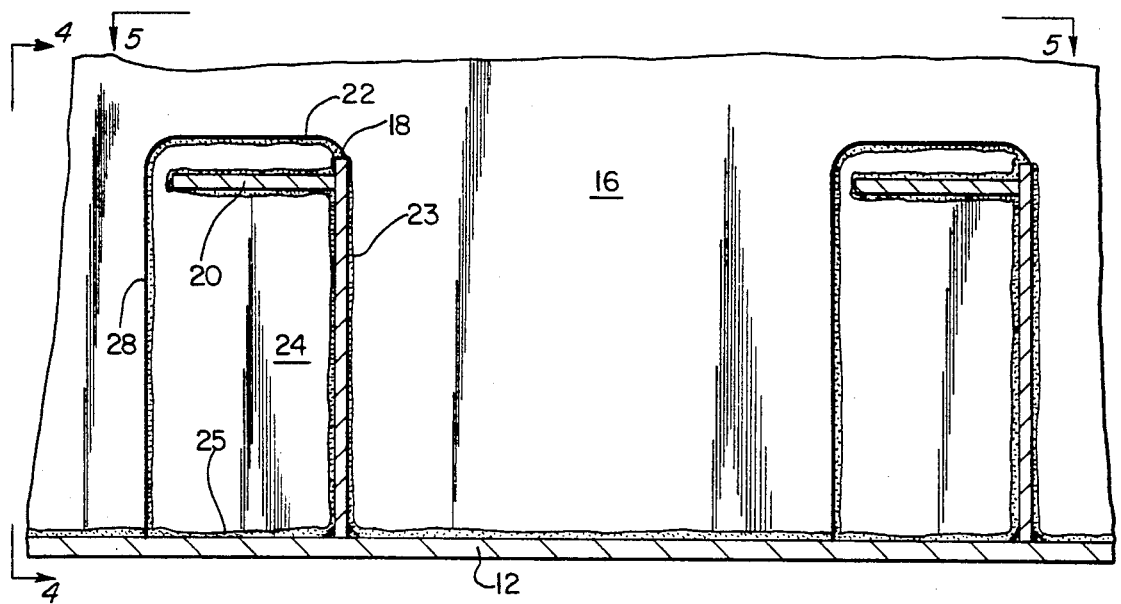
FIG. 3 is a rear view of the embodiment shown in FIGS. 1 and 2.
Figure 4:
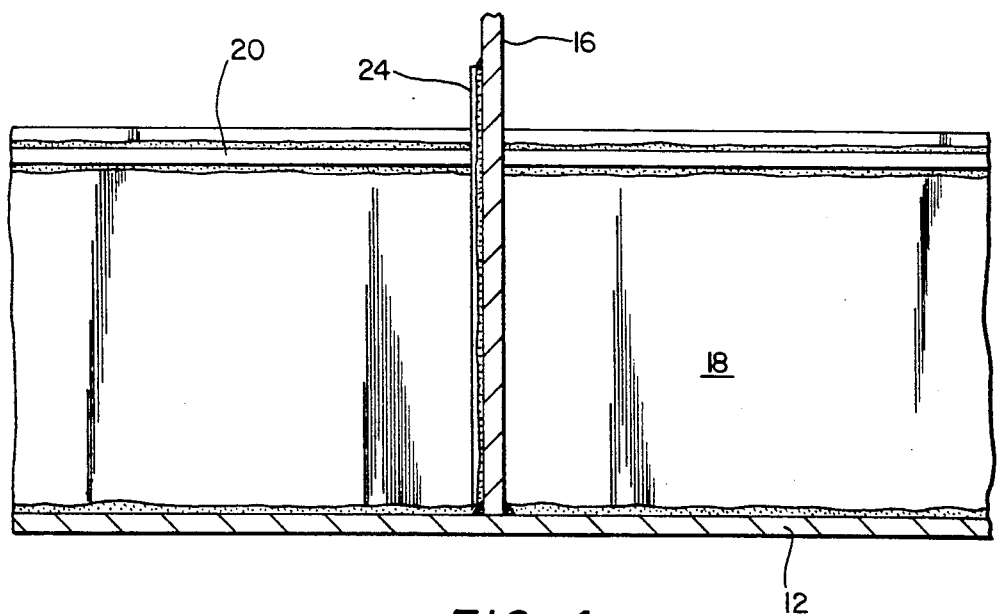
FIG. 4 is an end view of the embodiment shown in FIGS. 1 through 3, taken along line 4—4 of FIG. 3.
Figure 5:
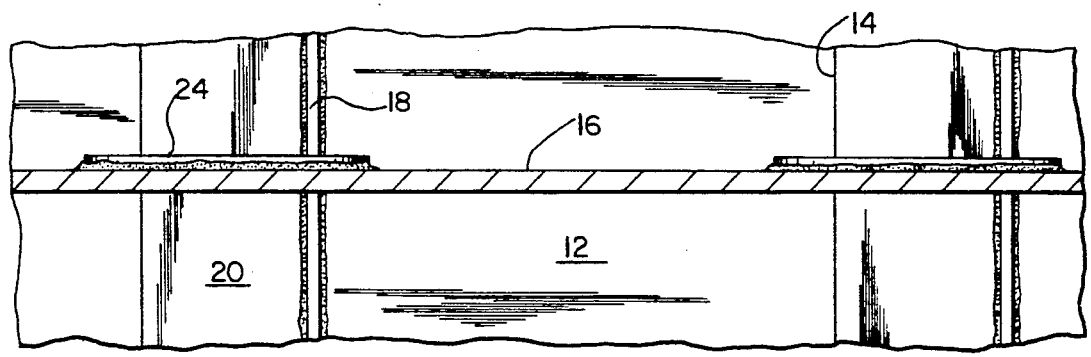
FIG. 5 is a plan view of the embodiment shown in FIGS. 1 through 4, taken along line 5—5 of FIG. 3.

Web 16 includes at least one opening 22 for receiving each longitudinal member 14, as best seen in FIG. 3, thereby permitting the web to be lowered over longitudinal member 14. The opening 22 is larger in height and width than the longitudinal member 14 to allow for manufacturing variances. Web 16 will usually contain many openings 22 to accommodate a plurality of longitudinal members 14. It is important that when the web is lowered onto base plate 12, it should not be prevented from abutting base plate 12 by interference between a longitudinal member 14 and an opening 22.

Figure 6:
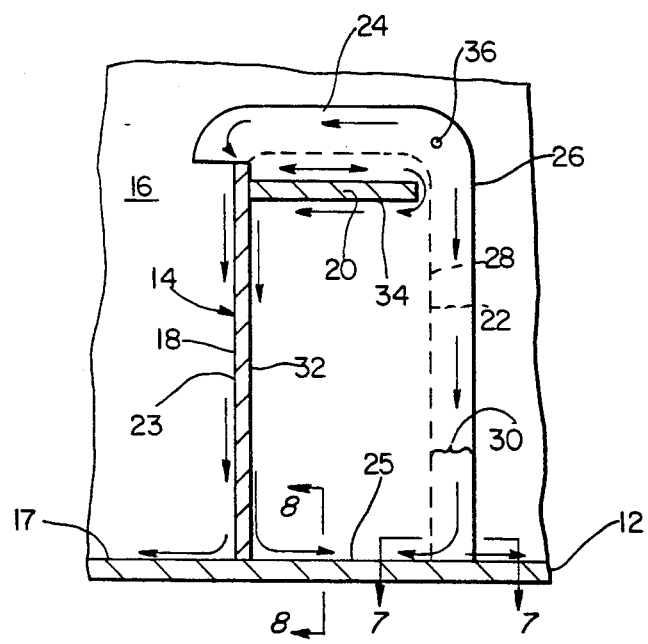
FIG. 6 is a schematic representation of the air flow of the embodiment shown in FIGS. 1-5, with the welds omitted for clarity.

An edge 23 of web 16 is positioned such that it horizontally abuts web portion 18 of longitudinal member 14. For each web opening 22, a lap collar 24 is provided. Typically, a plurality of lap collars 24 is provided corresponding to a plurality of openings 22 in web 16, each of the openings receiving a longitudinal member 14 therein. Lap collar 24 is positionable parallel to web 16 such that web opening 22 is completely covered by lap collar 24 and such that a lower edge 25 of lap collar 24 vertically abuts base plate 12. As best seen in FIG. 6, wherein web opening 22 is shown in hidden lines, a perimeter 26 of lap collar 24 extends beyond a perimeter 28 of web opening 22 to provide an overlapping portion 30.

Lap collar 24 is further positionable relative to longitudinal member 14 such that an edge 32 of lap collar 24 horizontally abuts web portion 18 of longitudinal member 14. Lap collar 24 further includes a slot 34 adapted to receive flange 20. It can thus be seen that lap collar 24 completely encloses the opening 22 in web 16, thereby providing, when the assembly is welded without defects, an oiltight and watertight boundary.

Figure 7:
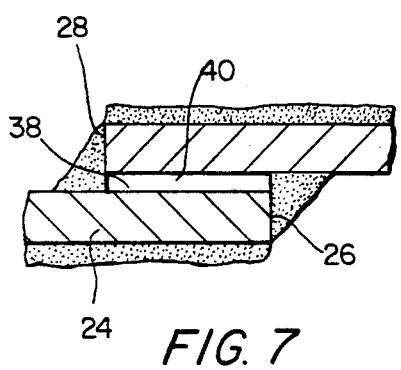
FIG. 7 is a detail view taken along lines 7—7 of FIG. 6.
Figure 8:
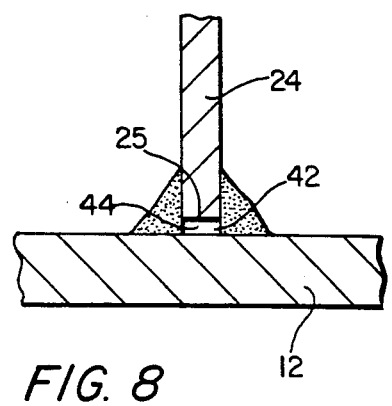
FIG. 8 is a detail view taken along lines 8—8 of FIG. 6.

Referring to FIGS. 6, 7 and 8, the provision of an air pocket and air channels of the present invention will be described. In FIG. 6, wherein the welds are omitted for clarity, the overlapping portion 30 of lap collar 24 and web 16 is clearly seen. An air hole 36 is provided in lap collar 24 and is located in the overlapping portion 30 thereof. On the front side of the assembly, lap collar 24 is welded to web 16 continuously around the perimeter 26 thereof. See FIG. 2. Likewise, on the rear side of web 16, as best shown in FIG. 3, web 16 is welded to lap collar 24 continuously around the perimeter 28 thereof. This results in the overlapping portion 30 being welded on either side thereof, creating a gap 38 between the lap collar and the web. Gap 38 is shown greatly exaggerated for the purposes of illustration in FIG. 7, wherein the base plate 12 is omitted for clarity. When pressurized air is applied, as described below, the gap 38 becomes an air pocket 40. However, it is to be understood that web 16 and lap collar 24 actually contact one another in this area. The gap is formed inherently because of unevenness in the surfaces of the lap collar and the web.

Similarly, as seen in FIG. 8, a gap 42 is created whenever the edge of one plate member, such as lap collar 24, is welded to base plate 12 using a double fillet weld in a tee configuration. FIG. 8 is illustrative of all abutting members described herein. Specifically, the joints between the abutting surfaces of base plate 12 and web lower edge 17, between abutting surfaces of web edge 23 and web portion 18 of longitudinal member 14, between abutting surfaces of lap collar lower edge 25 and base plate 12, and between abutting surfaces of lap collar edge 32 and web portion 18 of longitudinal member 14 are all welded using a double fillet weld in a tee configuration. As shown in FIG. 8, also greatly exaggerated for purposes of illustration, when lap collar lower edge 25 is welded to base plate 12, gap 42 is created. Once again, when pressurized air is applied as described below, the gap 42 becomes an air channel 44. Air channel 44 includes air pocket 40 and is in fluid communication therewith. Although FIG. 8 depicts lap collar 24 being elevated relative to base plate 12, the lap collar in fact abuts the base plate. As stated earlier, the provision of the gap is inherent in the joint due to the unevenness of the members.

With the provision of air pocket 40 and air channel 44, the welds can be tested for defects. This is accomplished by introducing pressurized air into the air pocket or air channel, as, for instance, air can be introduced through air hole 36 communicating with air pocket 40. A fitting may be required to introduce the pressurized air into the air hole. Defects in the welds can then be detected by locating points on the weld where air is leaking. One method of locating such points involves the application of a soap solution to the outer surface of the weld. With the introduction of pressurized air into the air pocket or channel, any defects in the welds will cause bubbles to form on the surface of the weld. In this way, weld defects can be readily observed and corrected.

In the assembly 10 as described herein, the entire compartment boundary along web 16 can be tested as one unit if the construction of the assembly is conducted in a specified sequence. Specifically, the longitudinal members 14 are first welded to the base plate 12. Web 16 is then lowered over and perpendicular to longitudinal members 14 such that it vertically abuts base plate 12 at web lower edge 17 and horizontally abuts longitudinal member 14 at web edge 23. Each lap collar 24 is positioned such that flange 20 of longitudinal member 14 is received within lap collar slot 34, with lap collar edge 32 horizontally abutting web portion 18 of longitudinal member 14 and lap collar perimeter 26 overlapping web opening perimeter 28, and such that lap collar lower edge 25 vertically abuts the base plate 12. The lap collars may then be tack welded in place.

At this point, a double fillet weld is used to weld web lower edge 17 to the base plate 12. Web 16 is likewise welded by a double fillet weld to longitudinal member 14 along web edge 23. Lap collar 24 is welded to web 16 continuously around lap collar perimeter 26 and continuously around web opening perimeter 28 by a fillet weld. Lap collar 24 is then welded by a double fillet weld to longitudinal member 14 continuously along lap collar edge 32 and slot 34. Finally, a double fillet weld is used to weld lap collar 24 to base plate 12 along lap collar lower edge 25. At this point, air channel 44 is formed, including air pocket 40. Air channel 44 extends along the entirety of the double fillet welds between the web lower edge 17 and the base plate, between the web edge 23 and longitudinal member 14, between the lap collar lower edge 25 and base plate 12, between lap collar edge 32, slot 34 and longitudinal member 14, and between the overlapping surfaces of web 16 and lap collar 24. As shown schematically in FIG. 6, the air pocket 40 and air channel 44 communicate to provide a continuous flow of pressurized air, as indicated by the arrows, along the bottom edge 17 of web 16 to the adjacent longitudinal members 14 on either side, and beyond, for the entire length of web 16 and base plate 12. In this way, th introduction of pressurized air into one of the air holes 36 permits the entire compartment boundary to be tested.

It is to be noted that when web lower edge 17 and lap collar lower edge 25 are welded to base plate 12, neither the web edge 17 nor the lap collar edge 25 is welded to the base plate in the area where lap collar 24 overlaps and is in contact with web 16, that is to say, the area forming air pocket 40; see FIG. 7 wherein the base plate welds are shown, the base plate being omitted for clarity. As seen in FIG. 7, in this area the web and lap collar are welded to the base plate only on the sides where they are facing and are not in contact with each other. This is critical in ensuring that air pocket 40 is in fluid communication with the portion of air channel 44 located between base plate 12 and the web 16 and lap collar 24.

Although only one lap collar 24 must necessarily have air hole 36, it is to be understood that each lap collar may have the air hole without affecting the operability of the invention. However, if more than one air hole is included, the air introduced into any one of the air holes must be of sufficient pressure and volume to permit the testing of the entire boundary despite the open air holes. It is further to be understood that, in the event that no bubbles are observed when the pressurized air is introduced, the air flow must be verified to ensure that there is no blockage in any air pocket or air channel. This can be accomplished by a number of means; however, the most efficient means is to determine whether air is flowing from the remaining air holes in the lap collars, or from the air channel 44 at the ends of the assembly, by applying the solution to the air holes or the ends of the air channel and observing any bubbles formed, the formation of bubbles confirming that air is flowing through the air pockets and channels at least to that point.

From the foregoing detailed description, it will be evident that there are a number of changes, adaptations and modifications of the present invention which come within the province of those having ordinary skill in the art to which the invention pertains. However, it is intended that all such variations not departing from the spirit of the invention be considered as within the scope thereof, limited solely by the appended claims.

We claim:

1. A structure for permitting the testing of welds, comprising:
   a base plate;
   a longitudinal member on said base plate;
   a web having an opening therein, said opening in said web being positioned over said longitudinal member such that said web vertically abuts said base plate and horizontally abuts said longitudinal member;
   a lap collar having an air hole and covering said web opening and positioned such that an edge of said lap collar overlaps an edge of said opening in said web and said lap collar vertically abuts said base plate and horizontally abuts said longitudinal member; and
   an air channel formed between welded abutting surfaces of said base plate and said web, and between welded abutting surfaces of said web and said longitudinal member, and between welded abutting surfaces of said lap collar and said base plate, and between welded abutting surfaces of said lap collar and said longitudinal member;
   said air channel also including an air pocket in fluid communication therewith and formed between said overlapping surfaces of said web and said lap collar when said lap collar is welded to said web continuously around the perimeter of both said lap collar edge and said web opening edge,
   said air channel being continuous between said abutting surfaces of said lap collar, said web, said longitudinal member, and said base plate and between overlapping surfaces of said lap collar and said web;
   whereby when said air channel is pressurized through said air hole, defects in said welds can be detected where air leaks from said welds.

2. A structure according to claim 1, wherein said lap collar is welded to said base plate on the side not in contact with said web to include an area where said lap collar overlaps said web as part of said air channel.

3. A structure according to claim 2, wherein said web is welded to said base plate on the side not in contact with said lap collar to include an area where said web overlaps said lap collar as part of said air channel.

4. A structure according to claim 1, wherein said web is welded to said base plate on the side not in contact with said lap collar to include an area where said web overlaps said lap collar as part of said air channel.

5. A structure according to claim 1, further comprising a plurality of said longitudinal members on said base plate, a plurality of lap collars, each of said lap collars horizontally abutting one of said longitudinal members, and a plurality of web openings, each of said web openings having one of said lap collars overlapping said opening and each of said web openings horizontally abutting said longitudinal member, each of said lap collars vertically abutting said base plate.

6. A structure according to claim 5, wherein each of said lap collars has an air hole disposed therein.

7. A structure according to claim 6, whereupon when pressurized air of sufficient pressure and volume is introduced into any one of said air holes, welds forming the air channel extending along the entirety of said base plate, said web, said plurality of longitudinal members, said plurality of lap collars, and said plurality of web openings may be tested for defects.

8. A structure according to claim 7, whereupon when said pressurized air is introduced into any one of said air holes, the continuity of said air channel can be verified by determining whether air is flowing out of the other air holes.

9. A structure according to claim 6, wherein said air channel ext ending along said base plate, said web, said plurality of longitudinal members, said plurality of lap collars, and said plurality of web openings is continuous.

10. A method of constructing and testing welded assemblies including a base plate, a longitudinal member on said base plate, a web having an opening therein for receiving said longitudinal member, and a lap collar closing said opening and having an air hole, said method comprising the steps of:
    positioning said web such that said longitudinal member is received within said opening and said web vertically abuts said base plate and horizontally abuts said longitudinal member;
    positioning said lap collar such that an edge of said lap collar overlaps an edge of said opening in said web and said lap collar vertically abuts said base plate and horizontally abuts said longitudinal member;
    forming an air channel from the abutting surfaces of each of said lap collar, said longitudinal member, said web, and said base plate with welds formed by welding the abutting surfaces of said web to said base plate, the abutting surfaces of said web to said longitudinal member, the abutting surfaces of said lap collar to said base plate, and the abutting surfaces of said lap collar to said longitudinal member;
    forming an air pocket in fluid communication with and being a portion of said air channel with welds formed by welding said lap collar to said web continuously around the perimeter of both said lap collar edge and said web opening edge;
    pressurizing said air channel with air through said air hole;
    detecting air leaks to determine the location of defects in said welds.

11. A method according to claim 10, further comprising the step of tack welding said lap collar in place relative to said web opening preceding the step of welding of the abutting surfaces of said base plate and said web.

12. A method according to claim 10, further comprising welding said lap collar to said base plate on the side not in contact with said web to leave the area where said lap collar overlaps said web as a portion of said air channel.

13. A method according to claim 12, further comprising welding said web to said base plate on the side not in contact with said lap collar to leave the area where said web overlaps said lap collar as a portion of said air channel.

14. A method according to claim 10, further comprising welding said web to said base plate on the side not in contact with said lap collar to leave the area where said web overlaps said lap collar as a portion of said air channel.

15. A method of constructing and testing welded assemblies including a base plate, a plurality of longitudinal members on said base plate, a web having a plurality of openings therein for receiving said longitudinal members, and a plurality of lap collars closing said openings, each of said lap collars closing one of said openings having an air hole, said method comprising the steps of:

positioning said web such that each of said longitudinal members is received within one of said openings and said web vertically abuts said base plate and horizontally abuts said longitudinal members;

positioning each of said lap collars relative to each of said web openings such that an edge of said lap collar overlaps an edge of said web opening and said lap collar vertically abuts said base plate and horizontally abuts one of said longitudinal members;

forming an air channel from the abutting surfaces of each of said lap collars, each of said longitudinal members, said web, and said base plate with welds formed by welding the abutting surfaces of said web to said base plate, the abutting surfaces of each of said web openings to the respective longitudinal member, the abutting surfaces of each of said lap collars to said base plate, and the abutting surfaces of each of said lap collars to the respective longitudinal member;

forming an air pocket in fluid communication with and being a portion of said air channel with welds formed by welding each of said lap collars to said web continuously around the perimeter of both said lap collar edge and said web opening edge;

pressurizing said air channel with air through one of said air holes;

detecting air leaks to determine the location of defects in said welds.

16. A method according to claim 15, further comprising the step of tack welding each of said lap collars in place relative to each of said web openings preceding the step of welding of the abutting surfaces of said base plate and said web.

17. A method according to claim 15, further comprising welding each of said lap collars to said base plate on the side not in contact with said web to leave the area where said lap collar overlaps said web as a portion of said air channel.

18. A method according to claim 17, further comprising welding said web to said base plate on the side not in contact with each of said lap collars to leave the area where said web overlaps said lap collars as a portion of said air channel.

19. A method according to claim 15, further comprising welding said web to said base plate on the side not in contact with each of said lap collars to leave the area where said web overlaps said lap collars as a portion of said air channel.

20. A method according to claim 15, wherein said pressurizing of said air channel is accomplished by introducing pressurized air of sufficient pressure and volume into any one of said air holes, and leak testing the entire length of said welds extending along said base plate, said web, said plurality of longitudinal members, said plurality of lap collars, and said plurality of web openings.

21. A method according to claim 15, further comprising the step of verifying the continuity of said air channel after the step of pressurizing of said air channel by determining whether air is flowing out of the other air holes.

22. A method according to claim 15, further comprising the step of verifying the continuity of said air channel after the step of pressurizing of said air channel by determining whether air is flowing out of the air channel at the ends of said welded assembly.

23. A structure for permitting the testing of welds, comprising:

a base plate;

a longitudinal member on said base plate;

a web having an opening therein, said opening in said web being positioned over said longitudinal member such that said web abuts said base plate and said web opening surrounds said longitudinal member;

a collar covering said web opening and positioned such that said collar abuts said longitudinal member;

said base plate, said longitudinal member, said web, said web opening and said collar being joined by welds;

an air channel formed along said welds of said longitudinal member, said collar, and said web opening and communicating with an air hole;

whereby when said air channel is pressurized through said air hole defects in said welds can be detected where air leaks from said welds.

24. A structure according to claim 23, wherein said air hole is in said collar.

25. A structure according to claim 23, wherein said air channel is formed along said welds joining said base plate and said web.

26. A structure according to claim 23, further comprising a plurality of said longitudinal members on said base plate, a plurality of said collars, each of said plurality of collars abutting one of said plurality of longitudinal members, and a plurality of said web openings, each of said plurality of web openings having one of said plurality of collars covering said opening, and each of said plurality of web openings surrounding one of said plurality of longitudinal members.

27. A structure according to claim 26, wherein one of said plurality of collars has an air hole disposed therein, whereupon when pressurized air of sufficient pressure and volume is introduced into said air hole, said welds forming said air channel extending along the entirety of said base plate, said web, said plurality of longitudinal members, said plurality of collars, and said plurality of web openings may be tested for defects.

28. A structure according to claim 26, wherein each of said plurality of collars has an air hole disposed therein, whereupon when pressurized air is introduced into any one of said air holes, the continuity of said air channel can be verified by determining whether air is flowing out of the other air holes.

29. A structure for permitting the testing of welds, comprising:

a base plate;

a longitudinal member on said base plate;

a web having an opening therein, said opening in said web being positioned over said longitudinal member such that said web abuts said base plate and said web opening surrounds said longitudinal member;

a lap collar covering said web opening and positioned such that an edge of said lap collar overlaps an edge of said opening in said web and abuts said longitudinal member;

said base plate, said longitudinal member, said web, said web opening and said lap collar being joined by welds;

an air channel formed along said welds of said longitudinal member, said lap collar, and said web opening and communicating with an air hole;

said air channel also including an air pocket in fluid communication therewith and formed between said overlapping edges of said web opening and said lap collar;

whereby when said air channel is pressurized through said air hole, defects in said welds can be detected where air leaks from said welds.

30. A structure according to claim 29, wherein said air hole is in said collar.

31. A structure according to claim 29, wherein said air hole communicates with said air pocket.

32. A structure according to claim 29, wherein said air channel is formed along said welds joining said base plate and said web.

33. A structure according to claim 32, wherein said lap collar is welded to said base plate on the side not in contact with said web to include an area where said lap collar overlaps said web as a part of said air channel.

34. A structure according to claim 33, wherein said web is welded to said base plate on the side not in contact with said lap collar to include an area where said web overlaps said lap collar as part of said air channel.

35. A structure according to claim 32, wherein said web is welded to said base plate on the side not in contact with said lap collar to include an area where said web overlaps said lap collar as part of said air channel.

36. A structure according to claim 32, further comprising a plurality of said longitudinal members on said base plate, a plurality of said lap collars, each of said plurality of lap collars abutting one of said plurality of longitudinal members, and a plurality of said web openings, each of said plurality of web openings having one of said plurality of lap collars covering said opening, and each of said plurality of web openings surrounding one of said plurality of longitudinal members.

37. A structure according to claim 36, wherein one of said plurality of lap collars has said air hole disposed therein, whereupon when pressurized air of sufficient pressure and volume is introduced into said air hole, said welds forming said air channel extending along the entirety of said base plate, said web, said plurality of longitudinal members, said plurality of lap collars, and said plurality of web openings may be tested for defects.

38. A structure according to claim 36, wherein each of said plurality of lap collars has said air hole disposed therein, whereupon when pressurized air is introduced into any one of said air holes, the continuity of said air channel can be verified by determining whether air is flowing out of the other air holes.

39. A method of constructing and testing a welded assembly, said assembly including a base plate, a longitudinal member on said base plate, a web having an opening therein for receiving said longitudinal member, and a collar covering said web opening and abutting said longitudinal member, said method comprising the steps of:

forming an air channel along the welds of said longitudinal member, said collar, and said web opening by welding said base plate, said longitudinal member, said web, said web opening, and said collar, said air channel communicating with an air hole;

pressurizing said air channel with air through said air hole; and detecting air leaks to determine the location of defects in said welds.

40. A method according to claim 39, wherein said air hole is in said collar.

41. A method according to claim 39, wherein the step of forming said air channel includes forming said air channel along the welds joining said base plate and said web.

42. A method according to claim 41, wherein said collar is positioned such that an edge of said collar overlaps an edge of said opening in said web, further comprising the step of forming an air pocket in fluid communication with and being a part of said air channel between said overlapping edges of said web opening and said collar preceding the step of pressurizing said air channel.

43. A method of constructing and testing welded assemblies including a base plate, a plurality of longitudinal members on said base plate, a web having a plurality of openings therein for receiving said plurality of longitudinal members, and a plurality of collars, each of said plurality of collars covering one of said plurality of web openings and abutting one of said plurality of longitudinal members, said method comprising the steps of:

forming an air channel along the welds of said base plate, said web, said plurality of longitudinal members, said plurality of collars, and said plurality of web openings by welding said base plate, said plurality of longitudinal members, said web, said plurality of web openings, and said plurality of collars, said air channel communicating with an air hole;

pressurizing said air channel with air through said air hole; and detecting air leaks to determine the location of defects in said welds.

44. A method according to claim 43, wherein each of said plurality of collars includes said air hole.

45. A method according to claim 43, wherein each of said plurality of collars is positioned such that an edge of said collar overlaps an edge of one of said plurality of web openings, further comprising the step of forming an air pocket in fluid communication with and being a part of said air channel between said overlapping edges of each of said plurality of web openings and each of said plurality of collars preceding the step of pressurizing said air channel, said air hole communicating with said air pocket.

46. A method according to claim 43, wherein said pressurizing of said air channel is accomplished by introducing pressurized air of sufficient pressure and volume into any one of said air holes, and leak testing the entire length of said welds extending along said base plate, said web, said plurality of longitudinal members, said plurality of collars, and said plurality of web openings.

* * * * *